UNITED STATES PATENT OFFICE.

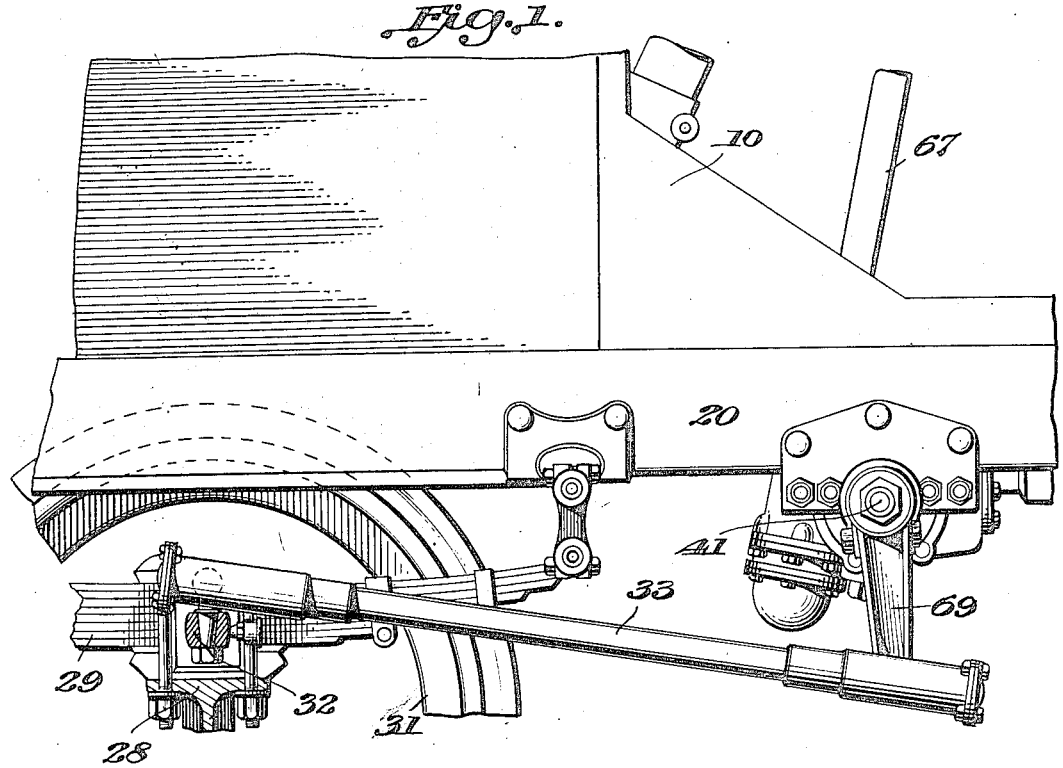

HAROLD D. CHURCH, OF DETROIT, MICHIGAN, ASSIGNOR TO PACKARD MOTOR CAR COMPANY, OF DETROIT, MICHIGAN, A CORPORATION OF MICHIGAN.

MOTOR-VEHICLE.

1,318,356.    Specification of Letters Patent.    Patented Oct. 14, 1919.

Original application filed May 29, 1915, Serial No. 31,172. Divided and this application filed April 8, 1918. Serial No. 227,286.

*To all whom it may concern:*

Be it known that I, HAROLD D. CHURCH, a citizen of the United States, and resident of Detroit, Wayne county, State of Michigan, have invented certain new and useful Improvements in Motor-Vehicles, of which the following is a specification.

This application is a division of application Serial No. 31,172 filed, May 29, 1915. This invention relates to motor vehicles and particularly to the steering connections thereof.

One of the objects of this invention is to provide a connection between the steering knuckle and the steering arm yieldable to both tensile and compression strains.

Other objects of the invention will appear from the following description taken in connection with the accompanying drawings, which form a part of this specification, and in which:—

Figure 1 is a side elevation of a portion of a motor vehicle embodying this invention;

Fig. 2 is an enlarged longitudinal vertical section of the connecting rod shown in Fig. 1;

Fig. 3 is an underneath view of the forward end of the connecting rod, as on the line 3—3 of Fig. 2;

Fig. 4 is a side view of the rear end of the connecting rod, seen from the opposite side to that shown in Fig. 1; and, Fig. 5 is a plan view of the steering knuckle and connections.

Referring to the drawings, the numeral 10 indicates the front end of a motor vehicle having side members 20. A front axle 28 suitably joined to the frame by springs 29 is provided with the usual steering knuckles 30 carrying the wheels 31. On one of the spindles is mounted an arm 32 for turning the knuckle and thereby steering the wheels.

The arm 32 is adapted to be operated by a connecting rod 33 from a steering arm 69 mounted on the rock shaft 41 of the steering mechanism. The rock shaft is supported by the frame in any suitable manner and is operated by the steering post 67.

Secured to the free end of the arm 69 is a ball member 71 which forms one of the parts of a ball and socket joint connection between the arm 69 and the connecting rod 33. This ball and socket joint is shown in Figs. 2 and 4 of the drawings.

The enlarged rear end of the connecting rod 33 is shown in section in Fig. 2, and is of tubular form. 72 indicates this tubular part and 73 and 74 indicate socket pieces arranged on either side of the ball member 71. The socket piece 74 has a shank 74' which is adapted to abut against an end cover 75 upon the compression of a spring 76 which is arranged between said socket piece and said cover. It is noted that the ball member 71 is adapted to be inserted into the tubular member 72 through the enlarged part of a key-hole slot 77 in the side of the tube. The contracted neck of the ball member 71 then slides into the narrower part of the key-hole slot and when the cover 75 is in place, the spring 76 and the positive stop 74' prevent the ball member from again reaching the enlarged part of the key-hole slot. It will be noticed that the socket piece 73 forms a rigid connection between the ball member 71 and the tube 33, and thereby transmits compression strains rigidly to the connecting rod. Tensile strains on the rod however, are transmitted yieldingly through the spring 76. Referring to the forward end 78 of the connecting rod, it will be seen that there is a ball and socket connection between this end of the rod and the arm 32 of the steering knuckle, which is slightly different from the ball and socket connection at the rear end of the connecting rod. The ball member 79 is arranged between socket pieces 80 and 81, and a spring 82 forms a cushion or yielding connection between the ball member 79 and the connecting rod 33 when the latter is under compression strains, while the socket member 80 abuts rigidly against the cover 83 and therefore transmits rigidly the tensile strains. The key-hole slot 84 is shown particularly in Fig. 3, and it will be understood that the socket piece 80 being held in place by the cover 83, prevents the ball member 79 from reaching the enlarged part of the key-hole slot after the parts are properly assembled.

From the above, it will be observed that the connecting rod 33 has a spring means at one end for yieldingly transferring the compression strains, and a similar means at the other end for yieldingly transmitting the tensile strains. And in both cases a key-hole slotted tubular part is used and positive means in addition to spring means are provided for preventing the ball member from accidentally reaching the enlarged part of the key-hole slot.

The form of the invention herein shown is illustrative only, and while I have described in some detail a specific embodiment of my invention which I deem to be new and advantageous and will specifically claim, yet I do not desire it to be understood that my invention is limited to the exact details of construction as it will be apparent that changes may be made therein without departing from the spirit or scope of the invention.

Having thus described my invention, what I claim and desire to secure by Letters Patent is:—

1. In a motor vehicle, the combination of a steering knuckle, a steering arm, and a connecting rod between said knuckle and arm, means providing a rigid connection between the knuckle and rod against tensile strains on the rod, said connecting means being adjustable under compression strains, and the connections between the arm and rod being yielding for tensile strains on the rod and rigid for compression strains, or vice versa.

2. In a motor vehicle, the combination of an axle having a steering knuckle, a frame mounted on springs on the axle, a steering mechanism including a steering arm mounted on the frame, and a connecting rod between said arm and knuckle and having a single spring at each end, one for taking the entire tensile strains and the other for taking the entire compression strains, and rigid abutments at opposite ends of the rod for taking the respective opposite compression and tensile strains.

In testimony whereof I affix my signature.

HAROLD D. CHURCH.